United States Patent
Fagadar-Cosma et al.

(10) Patent No.: US 9,348,422 B2
(45) Date of Patent: May 24, 2016

(54) METHOD FOR RECOGNIZING GESTURES AND GESTURE DETECTOR

(71) Applicant: Alcatel Lucent, Paris (FR)

(72) Inventors: Mihai Fagadar-Cosma, Antwerp (BE); Moulay Fadili, Cergy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/357,914

(22) PCT Filed: Nov. 26, 2012

(86) PCT No.: PCT/EP2012/073604
§ 371 (c)(1),
(2) Date: May 13, 2014

(87) PCT Pub. No.: WO2013/083423
PCT Pub. Date: Jun. 13, 2013

(65) Prior Publication Data
US 2014/0300684 A1 Oct. 9, 2014

(30) Foreign Application Priority Data

Dec. 5, 2011 (EP) ..................................... 11290561

(51) Int. Cl.
*G06F 3/01* (2006.01)
*H04N 7/14* (2006.01)
(Continued)

(52) U.S. Cl.
CPC .............. *G06F 3/017* (2013.01); *G06F 3/0304* (2013.01); *G06K 9/00234* (2013.01); *G06K 9/00355* (2013.01); *H04N 7/142* (2013.01)

(58) Field of Classification Search
CPC ....... G06F 3/017; G06F 3/0304; H04N 7/142; G06K 9/00355; G06K 9/00234
USPC .............. 345/174, 173; 348/14.03, 14.08, 77, 348/370; 382/103, 128, 167, 190, 118, 161, 382/274; 706/52; 725/10; 715/863
See application file for complete search history.

(56) References Cited

U.S. PATENT DOCUMENTS 4,737,847 A * 4/1988 Araki ............... G08B 13/19602
348/161
4,933,885 A * 6/1990 Kato .................. G05B 23/0272
700/286
(Continued)

FOREIGN PATENT DOCUMENTS

CN     101810003     8/2010
CN     101874404     10/2010
(Continued)

OTHER PUBLICATIONS

Junwei Han et al; Automatic Skin Segmentation for Gesture Recognition Combining Region and Support Vector Machine Active Learning; Automatic Face and Gesture Recognition, 2006; FGR 2006; 7th International Conference on Southampton, UK Apr. 10-12, 2006; Piscataway, NJ, USA, IEEE, Apr. 10, 2006; pp. 237-242; XP010911561; DOI: 10.1109/FGR.2006.27; ISBN: 978-0-7695-2503-7.

*Primary Examiner* — Gerald Gauthier
(74) *Attorney, Agent, or Firm* — Patti & Malvone Law Group, LLC

(57) ABSTRACT

The present invention relates to a method for recognizing gestures within a two-dimensional video stream for use in conference situations and the like, comprising the step of performing a skin-recognition within a screen of the video stream for recognizing skin parts, identifying at least one body part within the recognized skin parts, monitoring a state of at least one predefined screen area in respect to the at least one body part, and providing a control signal indicating a detected gesture upon detection of a change of state. The present invention further relates to a gesture detector adapted to perform the above method, a presentation system comprising the above gesture detector and a video camera device comprising a video camera and the above gesture detector.

17 Claims, 3 Drawing Sheets

(51) Int. Cl.
*G06F 3/03* (2006.01)
*G06K 9/00* (2006.01)

(56) References Cited

U.S. PATENT DOCUMENTS

| | | | | |
|---|---|---|---|---|
| 7,593,552 | B2* | 9/2009 | Higaki | G06K 9/00375 382/103 |
| 7,778,483 | B2* | 8/2010 | Messina | G06K 9/00234 348/254 |
| 7,844,076 | B2 | 11/2010 | Corcoran et al. | |
| 7,924,271 | B2* | 4/2011 | Christie | G06F 3/04883 345/173 |
| 8,014,567 | B2* | 9/2011 | Yoon | G06K 9/00355 345/156 |
| 8,086,971 | B2* | 12/2011 | Radivojevic | G06F 1/1626 715/863 |
| 8,144,129 | B2* | 3/2012 | Hotelling et al. | 345/174 |
| 8,290,210 | B2* | 10/2012 | Fahn | G06F 3/017 382/103 |
| 8,411,920 | B2* | 4/2013 | Saijo et al. | 382/128 |
| 8,477,235 | B2* | 7/2013 | Mitani et al. | 348/370 |
| 8,510,252 | B1* | 8/2013 | Gargi et al. | 706/52 |
| 8,620,024 | B2* | 12/2013 | Huang | G06F 3/017 348/169 |
| 8,675,916 | B2* | 3/2014 | Kang | G06K 9/00228 348/365 |
| 8,786,692 | B2* | 7/2014 | Mori et al. | 348/77 |
| 2003/0179931 | A1* | 9/2003 | Sun | 382/190 |
| 2008/0019589 | A1 | 1/2008 | Yoon et al. | |
| 2008/0089583 | A1* | 4/2008 | Messina | G06K 9/00234 382/167 |
| 2009/0037945 | A1* | 2/2009 | Greig et al. | 725/10 |
| 2010/0329509 | A1 | 12/2010 | Fahn et al. | |
| 2012/0224042 | A1* | 9/2012 | Saijo | 348/77 |
| 2014/0300684 | A1* | 10/2014 | Fagadar-Cosma et al. | 348/14.03 |
| 2015/0077504 | A1* | 3/2015 | Fagadar-Cosma et al. | 348/14.08 |
| 2015/0304606 | A1* | 10/2015 | Fagadar-Cosma | H04N 7/147 348/14.08 |

FOREIGN PATENT DOCUMENTS

| | | |
|---|---|---|
| JP | 2004185555 | 7/2004 |
| JP | 2010534895 | 11/2010 |
| JP | 2010541398 | 12/2010 |
| KR | 10-0776801 | 11/2007 |
| WO | 2009/131539 | 10/2009 |
| WO | 2009/156565 | 12/2009 |

* cited by examiner

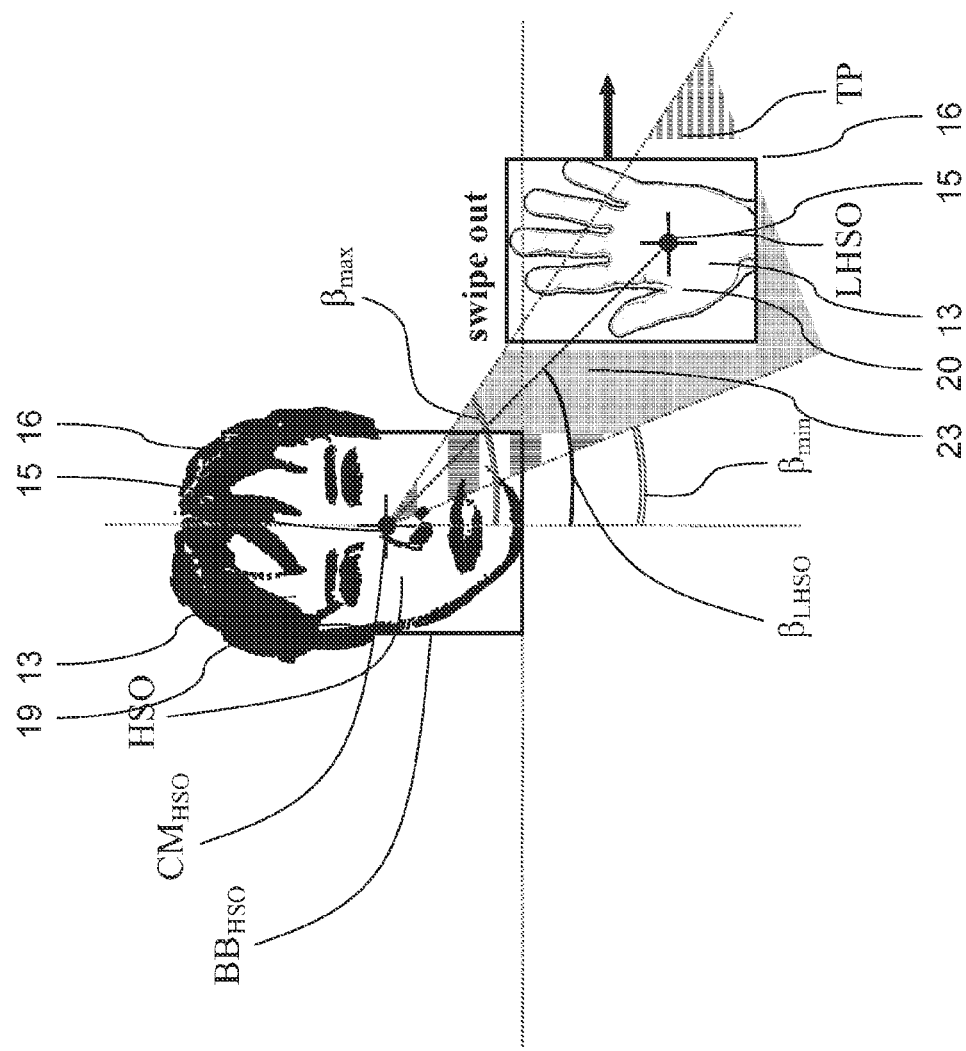

METHOD FOR RECOGNIZING GESTURES AND GESTURE DETECTOR

TECHNICAL FIELD

The present invention relates to the field of gesture recognition, more particularly to gesture recognition in a video stream.

BACKGROUND

Gesture detection is becoming more and more important in nowadays world, since the detection of gestures enables a user to operate an IT-system, e.g. desktop computers, notebooks, PDAs, smart phones, game consoles, or others, based on simple and even natural human gestures without the need of using particular input devices like keyboards, trackballs, game controllers or others. Such input devices require a user to adapt his behavior to the needs of the particular input device, which may even differ from input device to input device. Although methods for recognizing gestures and gesture detectors are already known in the art, gesture recognition is only rarely applied in exceptional cases. Particular hardware requirements and a high computational effort for performing gesture detection prevent gesture control from being widely applied.

One such system for detecting gestures is based on a stereoscopic camera and a microphone hardware accessory, which are specifically designed for gesture detection. This technique is for example known to end-users as Kinect for use together with Microsoft X-Box 360 gaming console. In general, users can control an IT-system using the above hardware by means of gestures, e.g. for control of an augmented reality environment. Drawbacks of this solution are its dependency on the dedicated hardware, which makes it difficult to apply gesture recognition to any IT-system. Also, the Kinect-technology requires a well defined environment, in which the user can assure that gestures will be recognized by the Kinect-system. Furthermore, a calibration of the Kinect-system is required for each user. Another drawback of the Kinect-system is that the computational effort for recognizing gestures is very high, which makes it impossible to use gesture recognition on IT-systems having a low computational performance, which generally applies to mobile devices. For example in video conference situations, participants, who are e.g. out of the office in public locations using public access means for participating in the video conference, are excluded from gesture recognition due to lack of suitable hardware and the unsuitability of the public environment for gesture recognition. The same applies for the use of gesture detection in a presentation system to control a presentation device.

SUMMARY

It is therefore an object of the present invention to provide a method for recognizing gestures and a gesture detector, which can be used with standard hardware components, which allow powerful and reliable gesture detection with low computational effort. Furthermore, it is an object of the present invention to provide a video camera system for gesture detection, which is simple to use, which allows powerful and reliable gesture detection with low computational effort and which is cost-efficient. Finally, it is an object of the present invention to provide a presentation system, which can be easily controlled by human gestures, which is independent from hardware requirements and which allows powerful and reliable gesture detection with low computational effort.

The present invention relates to a method for recognizing gestures within a two-dimensional video stream for use in conference situations and the like. The present invention further relates to a gesture detector comprising an input for receiving a video stream, and a signaling output adapted to provide a control signal indicating a detected gesture, whereby the gesture detector is adapted to perform the above method. The present invention also relates to a presentation system comprising a video camera for generating a video stream, a presentation device for running a presentation comprising a signaling input adapted to receive a control signal for controlling the presentation, and the above gesture detector, whereby the input of the gesture detector is connected to the video stream generated by the video camera and the signaling output of the gesture detector is connected to the signaling input of the presentation device, and the presentation device is adapted to control the presentation upon reception of control signals from the gesture detector. Finally, the present invention relates to a video camera device comprising a video camera and the above gesture detector.

In particular, the present invention provides a method for recognizing gestures within a two-dimensional video stream for use in conference situations and the like, comprising the step of performing a skin-recognition within a screen of the video stream for recognizing skin parts, identifying at least one body part within the recognized skin parts, monitoring a state of at least one predefined screen area in respect to the at least one body part, and providing a control signal indicating a detected gesture upon detection of a change of state.

The present invention further provides a gesture detector comprising an input for receiving a video stream, and a signaling output adapted to provide a control signal indicating a detected gesture, whereby the gesture detector is adapted to perform the above method.

The basic idea is to perform a gesture detection based on a state machine, so that the state of the at least one body part can be monitored compared to the predefined screen area. The state machine can be easily implemented and requires only low computational effort for recognizing gestures. Gesture recognition is based on the state machine, i.e. the recognition of a gesture is determined by the current state and by a recognition of skin parts and body parts in a current scene of the video frame.

A scene, in this regard, refers to momentary video information of the video stream. Preferably, scenes are based on frames of the video stream. A history of scenes or particular data of previous scenes is not required and therefore not considered for the inventive gesture detection.

The detection of the body part is based on a prior skin-recognition. Skin-recognition is typically based on a detection of certain areas having a certain color within a scene of the video stream. Essentially, the color of each pixel in a frame of the video stream is compared with a set of rules defined in a particular color space such as RGB, YUV or HSV. Mathematically, each rule defines a plane that divides the color space into disjoint regions. The volume determined in the color space by the intersection of all planes corresponds to skin color.

Preferably, a mixture of rules defined over the HSV and RGB color spaces is applied for skin-recognition. By representing the pixel color as a vector denoted with [R, G, B] in the RGB color space and, respectively [H, S, V] in the HSV color space, the following composite rule is used to label the pixel as skin:

$(R-G>29)$ and $(R-B>29)$ and $(H<27)$ and $(S>=0.188)$

The skin-recognition works as follows. The above rule is applied to each pixel in the frame, returning true for skin and false otherwise. Next, a binary skin mask of the same size as the input frame is filled in with the value 1 for a skin pixel and a value 0 for a non-skin pixel. Accordingly, the binary skin mask, also referred to as skin image, contains the recognized skin parts.

The skin-recognition can be easily done in conference situations and the like, which assumes certain preconditions. In such conference situations and the like, it is assumed that only the upper torso of a person is visible and skin parts of a body of one person are located in essentially the same plane. Furthermore, conference situations and the like are usually defined by the person sitting in front of the camera and directing himself towards the camera, for example in the style of a news speaker. This refers especially to a person holding a presentation, whereby the video camera focuses on this person.

Also the identification of body parts in the conference situations and the like is rather simple, since the visibility of the upper torso of the person implies that a face and/or a hand of a person are visible. Especially when a certain dress code is maintained, it can be assumed that a body and arms of a person are covered, leaving face and hands to be identified. The more assumptions are given in respect to conference situations and the like, the easier is the identification of the body parts within the recognized skin parts.

The control signal can indicate any kind of gesture suitable for recognition by the above method and gesture detector, e.g. simple gestures like raising a hand, or combined gestures, e.g. raising right and left hand. For example, a hand raised gesture is identified by raising a hand, i.e. placing a hand within the predefined screen area, which is in this case located in an upper part of the screen area. A further gesture can be defined as double raised hand, i.e. raising a hand, lowering the hand out of the predefined stream area, and raising the hand again. Also, changes of state of different screen areas in respect to different body parts can be combined as a single gesture, e.g. raising right and left hand.

The gesture detector can be located essentially at any place independently from a source of the video stream. The input for the video stream can be a video input, e.g. an analog or digital video input, or any kind of data input for transmission of a video stream via an IP-network, e.g. a LAN-connector. The gesture detector performs the above method by means of an internal processing unit, or under use of processing means, which are located outside the gesture detector. Accordingly, the detection of the gestures can even be performed by means of cloud computing with one or more processing units located outside the gesture detector.

The present invention further provides a video camera device comprising a video camera and the above gesture detector.

The video camera provides the video stream in accordance with the above method and gesture detector. The video camera device can be provided as a single apparatus or comprising one independent apparatus corresponding to the video camera and one independent apparatus corresponding to the gesture detector. The video camera and the gesture detector are connected by means of a network connection, e.g. a wired or wireless LAN-connection, or any kind of suitable video connection. Preferably, the gesture detector of the video camera device can make use of cloud services, as describe above in respect to the gesture detector. The use of cloud services enables the provisioning of a very simple and cheap gesture detector.

The present invention also provides a presentation system comprising a video camera for generating a video stream, a presentation device for running a presentation, whereby the presentation device comprises a signaling input adapted to receive a control signal for controlling the presentation, the above gesture detector, whereby the input of the gesture detector is connected to the video stream generated by the video camera and the signaling output of the gesture detector is connected to the signaling input of the presentation device, whereby the presentation device is adapted to control the presentation upon reception of control signals from the gesture detector.

For the presentation system, the presentation device can be located at any place. The signaling input is for example a network input, which is connected with a network output of the gesture detector. Accordingly, all components of the presentation system can be located apart from each other. The presentation device can be e.g. a local computer, which receives the control signal from the gesture detector, or a central server located with a computer network. The presentation device can even be a kind of virtual device provided by a cloud service. Preferably, the video camera device is connected to the gesture detector via a network connection. Preferably, the presentation system is part of a video conferencing system. The video camera is therefore part of the presentation system as well as of the video conferencing system. The gesture detector can be located at any place along a transport route of the video stream from the video camera to display devices of other participants of the video conference. The presentation device can be provided integrally with any kind of server of the video conferencing system, or at any other place, as specified above.

According to a preferred embodiment the method is adapted to perform all method steps for each video frame of the video stream. The simple processing of the video stream allows performing the skin-recognition, to identify the body part and to monitor the predefined screen area in respect to the body part, for each frame. Accordingly, the accuracy of the gesture detection can be increased.

A preferred embodiment comprises the step of predefining the predefined screen area in relation to the position of one body part. This allows easily adapting the method to different users having different measures and/or different positions in respect to the screen, so that the detection of the gestures is equally reliable for all these users in all positions. Additionally, a relative position of detected skin parts can be used for identifying different body parts, e.g. under the assumption of the hands being located in a lower right and left area of the screen.

Preferably, the predefined screen area is continuously adapted, so that when the user moves within the screen, gestures can be reliably detected. Even the change of the user is possible e.g. from a tall user to a short user, whereby for both users the gesture recognition can be reliably performed. As one example, the predefined screen area can be predefined in relation to the position of a hand. Accordingly, a relative movement of the hands can be detected as a gesture. In a different embodiment, the predefined screen area is a fixed area of the screen, which enables a very efficient processing of the video stream.

In a modified embodiment the step of predefining the predefined screen area comprises predefining the screen area in respect to a position of a face, and the step of monitoring a state of at least one predefined screen area in respect to the at least one body part comprises monitoring a hand. The face is usually characterized by being the biggest skin part within the screen, which makes detection rather simple. Furthermore, the face does not move frequently within the screen. In contrast, hands are frequently used and moved, for example to support speech by making publicly known gestures, indicating forms or pointing directions. Due to the relatively constant position, the face is a suitable basis for defining gestures. Also, a range of movement of hands in relation to the head is limited by the arms, and therefore easily detectable. Preferably, an angular position of the respective body part in relation to the head is monitored to identify a state.

In a preferred embodiment the step of identifying at least one body part within the recognized skin parts comprises identifying the skin part having the biggest size as belonging to a human face. Additionally or alternatively, also currently available face detectors, e.g. the HAAR feature classifier, can be used for face recognition.

In a preferred embodiment the step of identifying at least one body part within the recognized skin parts comprises identifying the skin part having the second biggest size as belonging to a human hand. Especially in conference situations and the like, such identification of body parts is highly reliable, since the number of available body parts in the screen is limited. Background persons, if present, will usually have reasonably smaller size on the screen, so that they can reliably be discarded for gesture recognition. Preferably, a hand is identified as a right or left hand based on its position relative to the face. Accordingly, a hand on a right side of the face is identified as right hand, whereas a hand on the left side of the face is identified as left hand. Even both hands located on the same side of the face can be reliably recognized due to their different distance from the face. Therefore, recognition of the right and left hand can be performed with high reliability.

In a modified embodiment the step of identifying at least one body part within the recognized skin parts comprises applying metrics of the golden ratio. The golden ratio defines a particular relation between width and height of human body parts, particularly human faces, which is universally applicable to almost any face. Accordingly, a skin part having dimensions according to the golden ratio can easily be identified as body part.

In a preferred embodiment the step of monitoring a state of at least one predefined screen area in respect to the at least one body part comprises monitoring a center position of the at least one body part. The center position can be evaluated by any of various algorithms generally referred to in the art as those directed to finding a "center of mass" of an object. Identification of the center of the body part facilitates monitoring of the predefined area and the identified body parts. Based on the center position, it is also rather simple to monitor if a body part enters the predefined screen area. Preferably, an additional bounding box around a skin part is used, which provides an estimate of the skin part within the screen. This further facilitates gesture detection since the detailed screen information is not required for further processing.

In a preferred embodiment the step of providing a control signal indicating a detected gesture upon detection of a change of state comprises identifying the change of state for a predefined time. Accordingly, an averaging is performed, which allows a more reliable detection of states and therefore a more reliable detection of gestures. Video errors and noise, which can prevent successful skin-recognition and/or identification of a body part, and which are not permanent, will therefore not decrease the reliability of the detection of gestures. The predefined time duration can be specified according to particular requirements, e.g. depending on the kind of gestures to be recognized, a frame rate, or an individual behavior of a person.

In a preferred embodiment the step of monitoring a state of at least one predefined screen area in respect to the at least one body part comprises monitoring a movement state of the at least one body part within the at least one predefined screen area. With the movement state, gestures defined by movement, also referred to as sweeping or swiping gestures, can be easily detected. The movement state can be defined as an indication of movement of the respective body part. Preferably, the movement state comprises monitoring a position, which allows deriving a direction of the movement. Accordingly, directions of swiped gestures can also be detected. Even more preferably, the movement state is monitored as an angular speed.

In a preferred embodiment, the gesture detector comprises one instance for monitoring each state of at least one predefined screen area in respect to the at least one body part. Each instance monitors the state independently, which enables a high variety of possible gestures to be recognized. Preferably, predefined screen areas and body parts are monitored independently for each instance, i.e. a detection of a body part within a predefined screen area can be used for detecting different gestures, e.g. when a right arm is raised in addition to a left arm, or independently without the left arm.

BRIEF DESCRIPTION OF THE DRAWINGS

Some embodiments of apparatus and/or methods in accordance with the present invention are now described, by way of example only, and with reference to the accompanying drawings, in which:

FIG. 3 is a schematical view of a video frame indicating a method for detecting a hand movement as swipe out gesture according to an exemplary embodiment.

DETAILED DESCRIPTION

Figure 1:
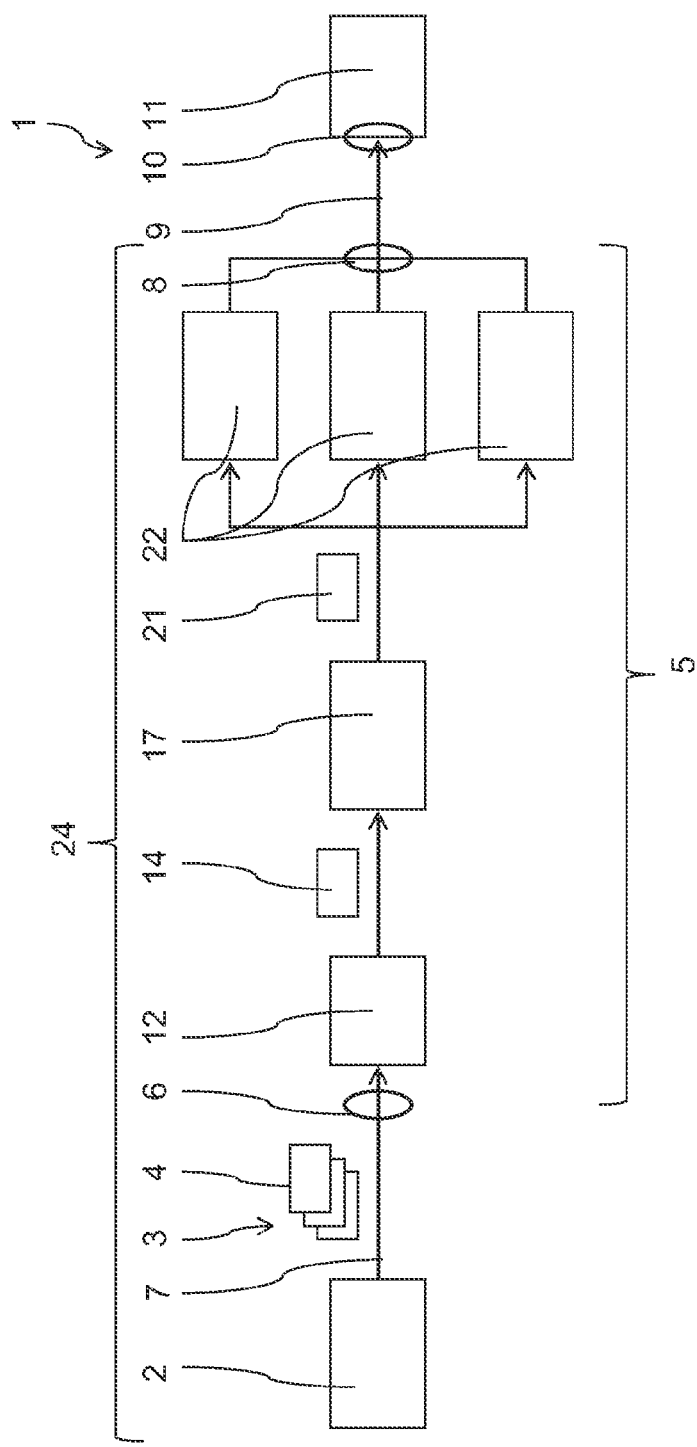
FIG. 1 is a schematical view of a presentation system according to an exemplary embodiment.

FIG. 1 shows a presentation system 1 according to an exemplary embodiment. The presentation system comprises a video camera 2, which generates a video stream 3 comprising multiple individual video frames 4, whereby the video frames 4 refer to screens according to the present invention. Different video frames 4 are shown in FIGS. 2 and 3.

The presentation system 1 further comprises a gesture detector 5, whereby an input 6 of the gesture detector 5 is connected to the video stream 3 generated by the video camera 2 via LAN-connection 7. The gesture detector 5 further comprises a signaling output 8, which is connected via a further LAN-connection 9 to a signaling input 1C of a presentation device 11 of the presentation system 1. The presentation device 11 is adapted to run a presentation and to control the presentation upon reception of control signals from the gesture detector 5.

Figure 2:
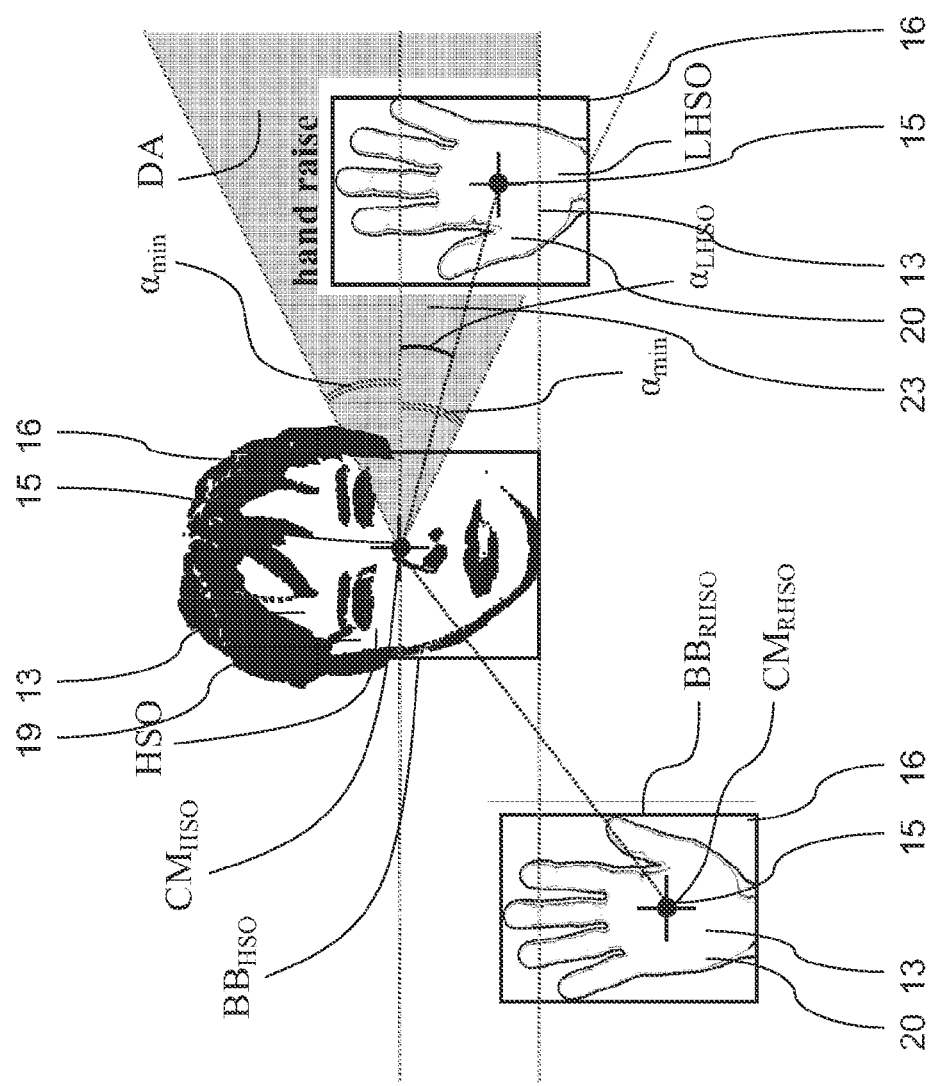
FIG. 2 is a schematical view of a video frame indicating a method for detecting a hand raise gesture according to an exemplary embodiment.

The gesture detector 5 comprises a skin segmentation unit 12, which is adapted to perform skin-recognition within the video stream 3 for recognizing skin parts 13, which are shown in FIGS. 2 and 3. Skin-recognition within the skin segmentation unit 12 is based on a detection of certain areas of a frame 4 having a certain color, which is associated to skin. The skin segmentation unit 12 provides as output a skin image 14, which contains an identification of the skin parts 13 within the video frame 4.

In this embodiment, skin-recognition is based on a detection of certain areas having a certain color within the video frame 4. Essentially, the color of each pixel in the video frame 4 of the video stream is compared with a set of rules defined in a particular color space such as RGB, YUV or HSV. Mathematically, each rule defines a plane that divides the color space into disjoint regions. The volume determined in the color space by the intersection of all planes corresponds to skin color.

A mixture of rules defined over the HSV and RGB color spaces is applied for skin-recognition in this embodiment. By representing the pixel color as a vector denoted with [R, G, B] in the RGB color space and respectively [H, S, V] in the HSV color space, the following composite rule is used to label the pixel as skin:

$$(R-G>29) \text{ and } (R-B>29) \text{ and } (H<27) \text{ and } (S>=0.188)$$

The skin-recognition works as follows. The above rule is applied to each pixel in the video frame 4, returning true for skin and false otherwise. Next, the skin image 14 of the same size as the video frame 4 as binary file is filled in with the value 1 for a skin pixel and a value 0 for a non-skin pixel. Accordingly, the skin image 14 contains the recognized skin parts 13.

For each identified skin part 13, also referred to as scene object SO, its center of mass 15, also referred to as CM, is computed, as center position from all object pixels that have been labeled as skin. The center of mass 15 is a pair <X, Y> of image coordinates and is used to calculate the relative positions and angles between different skin parts 13 in the frame 4. In addition, each skin part 13 receives an associated bounding box 15, also referred to as BB, which is identified by its extreme left, right, top and bottom skin pixel coordinates and represented, as a <LEFT, TOP, RIGHT, BOTTOM> quadruple.

The gesture detector 5 further comprises a scene object identification unit 17, which receives the skin image 14 as input. The scene object identification unit 17 is adapted to identify body parts 19, 20 out of the skin parts 13 within the skin image 14. The scene object identification unit 17 first performs a basic identification of the body parts 19, 20, also referred to as scene objects (SO), by identifying the skin part 13 having the biggest size as face 19. The recognized skin parts 13 having the second biggest size are identified as hands 20. In detail, the hand 20 located on the left side of the face 19 is identified as left hand, whereas the hand 20 located on the right side of the face 19 is identified as right hand.

Additionally, the scene object identification unit 17 performs a second identification step applying metrics of the golden ratio to the recognized skin parts 13. Accordingly, a feasibility check is performed, if the width and height of the skin parts 13 identified as body parts 19, 20 fulfill the golden ratio. The scene object identification unit 17 provides as output a body image 21 with identified body parts 19, 20, whereby each body part 19, 20 is represented in accordance with the representation of the skin parts 13 within the skin image 14.

The gesture detector 5 further comprises a set of three gesture detector instances 22, also referred to as GDI, which are adapted to monitor a state of one predefined screen area 23 in respect to one body part 19, 20. The predefined screen area 23 is defined in each case in respect to the head 19 by an angular position, as indicated in FIGS. 2 and 3. The gesture detector instances 22 each monitor a state of one predefined screen area 23 in respect to a hand 20.

Upon receiving the body image 21 at its input, each gesture detector instance 22 calculates the relative angle and position between the position of the head 19, also referred to as HSO, and the corresponding positions of the left hand 20, also referred to as LHSO, or the right hand 20, also referred to as RHSO. Each of the gesture detector instances 22 applies a set of spatiotemporal rules on this data, which means that a relative position is evaluated and a change of this position is monitored over the time in order to update its current internal state. When a current internal state of a gesture detector instance 22 indicates a successful detection, a gesture event is raised by that gesture detector instance 22 and the respective control signal indicating the detection of the particular gesture is provided at the signaling output 8 of the gesture detector 5.

Now a detection of a hand raise gesture is described in detail. The gesture detector instance 22 for detecting the hand raise gesture, also referred to as HRGD, is built around a 2-state machine. In an IDLE state, the HRGD searches the current body image 21 for a condition (1), as specified below, which triggers the control signal for the hand raise gesture:

$$(CM_{SO}.Y>BB_{HSO}.BOTTOM) \text{ and } (\alpha<\alpha_{min}) \tag{1}$$

where:
SO=LHSO or RHSO
$\alpha=\arctg(abs(CM_{SO}.Y-CM_{HSO}.Y)/abs(CM_{SO}.X-CM_{HSO}.X))$
$\alpha_{min}$=an application-specific threshold (e.g. 30 deg)
X=X-coordinate
Y=Y-coordinate
BOTTOM=bottom skin pixel coordinate When the condition (1) becomes valid, meaning that the hand 20 has entered the predefined screen area 23, the HRGD enters the ACTIVE state. The ACTIVE state is maintained as long as condition (1) remains valid. When condition (1) becomes invalid, due to the hand 20 leaving the predefined screen area 23, the HRGD raises a hand down gesture and falls back to IDLE state.

Another gesture detector instance 20 is adapted to provide the control signal for an identified gesture upon identification of subsequent changes of a state. The gesture monitored by the respective gesture detector instance 22 consists of raising and lowering the hand 20. This gesture is detected upon detecting first the hand raise gesture and subsequently the hand down gesture, as described above. Accordingly, a change of state from the hand 20 not being within the predefined area 23 to the hand 20 being within the predefined area 23 to the hand 20 not being within the predefined area 23 triggers the respective gesture.

Now a detection of a swipe gesture, i.e. a gesture based on detection of a movement, is described in detail. The gesture detector instance 22 for detecting the swipe gesture, also referred to as SWGD, has an internal 3-state machine. The SWGD is able to detect either a swipe-in occurrence, caused by a movement of the hand 20 from the outer margin towards the center of the frame 4 or a swipe-out occurrence, caused by a movement of the hand 20 from the center of the frame 4 towards its outer margin. As a result, the gesture detector 5 may contain up to four SWGDs per conference participant, one for each possible combination of one hand 20 together with one direction of movement.

Subsequently is described the case of the swipe-out, detected by the SWGD. The detector starts with and maintains the IDLE state until the initiator condition (2) is met:

$$(CM_{SO}.Y<BB_{HSO}.BOTTOM) \text{ and } (\beta<=\beta_{min}) \tag{2}$$

where:
SO=LHSO or RHSO
$\beta = \text{arctg}(\text{abs}(CM_{SO}.X - CM_{HSO}.X)/\text{abs}(CM_{SO}.Y - CM_{HSO}.Y))$
$\beta_{min}$=an application-specific threshold (e.g. 5 deg)
X=X-coordinate
Y=Y-coordinate
BOTTOM=bottom skin pixel coordinate When this condition is met, the SWGD changes to TRACKING state. This state is maintained as long as the hand 20 moves in the expected direction without reaching a maximum hand to head angle threshold $\beta_{max}$ and that tracking is not lost for a time interval longer than an application-specific value $T_{max}$. If tracking is lost, as would occur e.g., if the hand SO disappeared from the scene, the SWGD returns back to IDLE state and no control signal is generated. If tracking is lost temporarily, e.g. due to a video error, the SWGD continues tracking, if the loss is shorter than a predetermined duration, e.g. about 10 frames.

If TRACKING occurs without losses, in the moment the activator condition (3) is met:

$$(CM_{SO}.Y < BB_{HSO}.\text{BOTTOM}) \text{ and } (\beta => \beta_{max}) \quad (3)$$

where:
SO=LHSO or RHSO
$\beta = \text{arctg}(\text{abs}(CM_{SO}.X - CM_{HSO}.X)/\text{abs}(CM_{SO}.Y - CM_{HSO}.Y))$
$\beta_{max}$=an application-specific threshold (e.g. 45 deg),
X=X-coordinate
Y=Y-coordinate
BOTTOM=bottom skin pixel coordinate the SWGD enters the ACTIVE state, in which a control signal for the swipe gesture is generated. The control signal contains parameters indicating the hand 20 and the direction of the movement.

Following the generation of the control signal, the SWGD immediately falls back into IDLE state and starts a new detection cycle.

The swipe-in case is very similar except for the fact that the initiator and activator conditions (2) and (3) are interchanged, since the expected movement of the hand 20 occurs in the opposite direction.

The above method is implemented in the gesture detector 5 to perform all steps for each video frame 4 of the video stream 3. Thus, skin-recognition and identification of body parts 19, 20 is performed for each video frame 4, and a state change is monitored. Upon detection of a state change the control signal for a detected gesture is raised. The gesture detector 5 is implemented to monitor the state change after each frame 4.

In this exemplary embodiment, the gesture detector 5 is provided apart from the video camera 2. Particularly, the gesture detector 5 is located in a so-called cloud for processing the video stream 3 and providing the control signals.

In this exemplary embodiment, the presentation system 1 forms part of a video conferencing system, which is not further shown in the figures. Accordingly, the video stream 3, which is provided by the video camera 2, is further provided to a server of the video conferencing system, which is also not shown in the figures. The video stream 3 is provided by the video conferencing server to further participants. The video conferencing server is further adapted to provide a video stream 3 backwards to all users.

A video camera device 24 according to an exemplary embodiment is provided as a combination of the video camera 2 and the gesture detector 5 as described above. The video camera device 24 forms an independent component, which can be used for providing the control signals to any kind of device. Similarly, also the gesture detector 5 can be used independently for combination with any available video camera 2 and any kind of device to be controlled by the control signals.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method of controlling a presentation on a computer-based presentation device by using a processing unit to recognize gestures within a video stream captured by a video camera connected to the processing unit comprising the steps of:
    performing a skin-recognition within a screen of the video stream for recognizing skin parts;
    identifying at least a face and a hand within the recognized skin parts;
    identifying a center point of the face and hand;
    defining at least one screen area by an angular position with respect to the center point of the face;
    monitoring a state of the at least one screen area;
    generating a control signal indicating a detected gesture upon detection of the entry of a hand into the at least one screen area; and
    inputting the control signal to the computer-based presentation device to control the presentation.

2. The method of claim 1, wherein all steps are performed for a plurality of screens of the video stream.

3. The method of claim 1, wherein
    the step of monitoring a state of the at least one screen area comprises monitoring a hand.

4. The method of claim 1, wherein the step of identifying at least a face and a hand within the recognized skin parts comprises identifying the skin part having a biggest size as a face.

5. The method of claim 1, wherein the step of identifying at least a face and a hand within the recognized skin parts comprises identifying the skin part having a second biggest size as a hand.

6. The method of claim 1, wherein the step of identifying at least a face and a hand within the recognized skin parts comprises applying metrics of the golden ratio.

7. The method of claim 1, wherein the step of providing a control signal indicating a detected gesture upon detection of the entry of a hand into the at least one screen area comprises tracking the hand for a predefined time duration.

8. The method of claim 1, wherein detection of the entry of a hand into the at least one screen area further comprises tracking the hand as long as it moves in an expected direction and does not disappear from the at least one screen area for longer than a predefined time duration.

9. The method of claim 1, wherein the step of monitoring a state of the at least one screen area comprises monitoring a gesture of the hand within the at least one screen area wherein the gesture further comprises raising or lowering the hand.

10. The method of claim 9, wherein further comprising the step of monitoring the at least one screen area for the conditions $(CM_{SO}.Y > BB_{HSO}.\text{BOTTOM})$ and $(\alpha < \alpha_{min})$ where:
    SO=LHSO or RHSO;
    $\alpha = \text{arctg}(\text{abs}(CM_{SO}.Y - CM_{HSO}.Y)/\text{abs}(CM_{SO}.X - CM_{HSO}.X))$;
    $\alpha_{min}$=an application-specific threshold (e.g. 30 deg);

X=X-coordinate;
Y=Y-coordinate; and
BOTTOM=bottom skin pixel coordinate.

11. The method of claim 1, wherein the step of monitoring a state of the at least one screen area comprises monitoring a gesture of the hand within the at least one screen area wherein the gesture further comprises a swipe-in of the hand towards a center of the at least one screen area or a swipe-out gesture of the hand towards an outer margin of the at least one screen area.

12. The method of claim 11, further comprising the step of monitoring the at least one screen area for the conditions ($CM_{SO}.Y > BB_{HSO}.BOTTOM$) and ($\beta < \beta_{min}$) where:
SO=LHSO or RHSO;
$\beta = arctg(abs(CM_{SO}.X - CM_{HSO}.X)/abs(CM_{SO}.Y - CM_{HSO}.Y))$;
$\beta_{min}$=an application-specific threshold (e.g. 5 deg);
X=X-coordinate;
Y=Y-coordinate; and
BOTTOM=bottom skin pixel coordinate.

13. The method of claim 11, further comprising the step of monitoring the at least one screen area for the conditions ($CM_{SO}.Y < BB_{HSO}.BOTTOM$) and ($\beta < \beta_{max}$) where:
SO=LHSO or RHSO
$\beta = arctg(abs(CM_{SO}.X - CM_{HSO}.X)/abs(CM_{SO}.Y - CM_{HSO}.Y))$
$\beta_{max}$=an application-specific threshold (e.g. 45 deg),
X=X-coordinate
Y=Y-coordinate
BOTTOM=bottom skin pixel coordinate.

14. A gesture detector, comprising:
a processing unit;
an input for receiving a video stream from a video camera; and
a signaling output adapted to provide a control signal indicating a detected gesture to a computer-based presentation device for controlling a presentation, wherein the gesture detector is configured to perform the steps of:
performing a skin-recognition within a screen of the video stream for recognizing skin parts;
identifying at least a face and a hand within the recognized skin parts;
identifying a center point of the face and hand;
defining at least one screen area by an angular position with respect to the center point of the face;
monitoring a state of the at least one screen area;
generating the control signal indicating a detected gesture upon detection of the entry of a hand into the at least one screen area; and
outputting the control signal from the signaling output to the computer-based presentation device to control the presentation.

15. A presentation system, comprising:
a video camera for generating a video stream;
a computer-based presentation device for running a presentation, whereby the presentation device comprises a signaling input adapted to receive a control signal for controlling the presentation device; and
a gesture detector further comprising a processing unit, wherein an input of the gesture detector is connected to the video stream generated by the video camera and a signaling output of the gesture detector is connected to the signaling input of the presentation device,
wherein the presentation device is configured to control the presentation upon reception of control signals from the gesture detector and wherein the gesture detector is configured to perform the steps of:
performing a skin-recognition within a screen of the video stream for recognizing skin parts;
identifying at least a face and a hand within the recognized skin parts;
identifying a center point of the face and hand;
defining at least one screen area by an angular position with respect to the center point of the face;
monitoring a state of the at least one screen area;
generating the control signal indicating a detected gesture upon detection of the entry of a hand into the at least one screen area; and
outputting the control signal from the signaling output to the computer-based presentation device to control the presentation.

16. The presentation system of claim 15, wherein the video camera is connected to the gesture detector via a network connection.

17. A video camera device, comprising: a video camera and a gesture detector further comprising a processing unit, said gesture detector coupled to a computer-based presentation device for controlling a presentation on the computer-based presentation device, wherein the gesture detector is configured to perform the steps of:
performing a skin-recognition within a screen of the video stream for recognizing skin parts;
identifying at least a face and a hand within the recognized skin parts;
identifying a center point of the face and hand;
defining at least one screen area by an angular position with respect to the center point of the face;
monitoring a state of the at least one screen area;
generating a control signal indicating a detected gesture upon detection of the entry of a hand into the at least one screen area; and
outputting the control signal to the computer-based presentation device to control the presentation.

* * * * *